United States Patent
Luther et al.

(10) Patent No.: US 6,957,920 B2
(45) Date of Patent: Oct. 25, 2005

(54) FERRULE ASSEMBLY HAVING HIGHLY PROTRUDING OPTICAL FIBERS AND AN ASSOCIATED FABRICATION METHOD

(75) Inventors: James P. Luther, Hickory, NC (US); Dennis M. Knecht, Hickory, NC (US); Hieu V. Tran, Charlotte, NC (US); Robert B. Elkins, II, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 129 days.

(21) Appl. No.: 10/178,653

(22) Filed: Jun. 24, 2002

(65) Prior Publication Data

US 2003/0235374 A1 Dec. 25, 2003

(51) Int. Cl.$^7$ .............................. G02B 6/40; G02B 6/36
(52) U.S. Cl. .............................. 385/85; 385/75; 385/76; 385/77; 385/78; 385/79; 385/80; 385/84
(58) Field of Search .............................. 385/71, 78, 80, 385/75, 76, 77, 79, 85–89, 147; 451/41, 28

(56) References Cited

U.S. PATENT DOCUMENTS

| | | | | |
|---|---|---|---|---|
| 6,129,865 A | * | 10/2000 | Jeong et al. | 264/1.25 |
| 6,196,732 B1 | | 3/2001 | Tamekuni et al. | 385/78 |
| 6,246,026 B1 | * | 6/2001 | Vergeest | 219/121.72 |
| 6,331,081 B1 | * | 12/2001 | Ohtsuka et al. | 385/85 |
| 6,350,062 B2 | * | 2/2002 | Knecht et al. | 385/84 |

FOREIGN PATENT DOCUMENTS

| | | | | |
|---|---|---|---|---|
| JP | 6-258552 | | 9/1994 | G02B/6/40 |
| JP | 07251363 A | * | 10/1995 | B24B/19/00 |
| WO | WO 97/34176 | | 9/1997 | G02B/6/38 |

OTHER PUBLICATIONS

Tsukamoto et al., Low–Loss MPO Connectors, International Wire & Cable Symposium–Proceedings of the 50$^{th}$ IWCS, pp. 379–380, Nov., 2001.

* cited by examiner

Primary Examiner—John R. Lee
Assistant Examiner—David A. Vanore
(74) Attorney, Agent, or Firm—Christopher C. Dremann (57) ABSTRACT

A ferrule assembly having highly protruding optical fibers and a corresponding method of efficiently, precisely and repeatedly fabricating the ferrule assemblies are provided. In this regard, a ferrule assembly is provided that includes a plurality of optical fibers extending at least about 3.5 μm beyond the front face. The end portions of the optical fibers of the ferrule assembly may also be substantially coplanar with the end portions of the optical fibers differing in position from one another by no more than 100 nm. The ferrule assembly may be efficiently fabricated by polishing the optical fibers to a desired protrusion without first grinding or polishing the optical fibers to be flush with the front face of the ferrule. The ferrule assembly may be even more efficiently fabricated in instances in which the ferrule includes at least one polishing feature, such as an outwardly extending pedestal or a recessed portion.

41 Claims, 9 Drawing Sheets

FERRULE ASSEMBLY HAVING HIGHLY PROTRUDING OPTICAL FIBERS AND AN ASSOCIATED FABRICATION METHOD

FIELD OF THE INVENTION

The present invention relates generally to ferrule assemblies having highly protruding optical fibers, such as optical fibers that protrude beyond the front face of a ferrule by at least about 3.5 $\mu$m. The present invention also relates to improved methods for fabricating ferrule assemblies and, in particular, to methods for fabricating ferrule assemblies having highly protruding optical fibers in which the optical fibers extend beyond the front face of the ferrule during the entire fabrication process.

BACKGROUND OF THE INVENTION

In order to effectively mate multifiber connectors, the end portions of the plurality of optical fibers upon which one connector is mounted must generally be brought into physical contact with the end portions of corresponding optical fibers upon which another connector is mounted. Direct physical contact between the end portions of corresponding pairs of optical fibers is particularly desirable for those multifiber connectors utilized in North America since index matching gel is rarely, if ever, utilized to assist in the interconnection of the optical fibers. As such, if multifiber connectors are mated without establishing direct physical contact between the corresponding optical fibers, the signals propagating along the optical fibers may be significantly attenuated, and the reflectivity experienced by the signals may be greatly increased.

Multifiber connectors generally include a multifiber ferrule defining a plurality of bores opening through the front face of the ferrule. Multifiber connectors also include a plurality of optical fibers that extend through respective bores. In order to establish direct physical contact between the end portions of corresponding optical fibers, the end portions of the optical fibers extend beyond the front face of the ferrule defining a protrusion distance. Conventionally, the protrusion distance, measured relative to the front face is 1 $\mu$m to, at most, 3 $\mu$m. Thus, the optical fibers will generally extend beyond any imperfections in the front face of the ferrule and beyond dust, dirt or the other debris that may collect upon the front face of the ferrule.

The typical process for establishing the desired fiber protrusion beyond the front face of a ferrule begins by grinding or polishing the optical fibers and the front face of the ferrule such that the end portions of the optical fibers are flush with the front face of the ferrule. Thereafter, the front face of the ferrule and the end portions of the optical fibers are polished in such a manner so as to preferentially remove portions of the front face of the ferrule relative to the end portions of the optical fibers. Following this preferential polishing process, the end portions of the optical fibers extend beyond the front face of the ferrule by a predefined length, typically between 1 $\mu$m and 3 $\mu$m. Unfortunately, the amount by which the end portions of the optical fibers protrude beyond the front face of a ferrule is sometimes inadequate. In these instances, portions of the front faces of the ferrules of a pair of mated multifiber connectors may make contact, potentially creating a gap between the end portions of the corresponding optical fibers.

A 1 $\mu$m to 3 $\mu$m protrusion distance may initially be adequate; however, optical fiber protrusion of this magnitude may become insufficient for several reasons. For example, ferrules formed of fused quartz disposed within a thermoset or thermoplastic matrix tend to absorb moisture. The absorbed moisture, in turn, causes the ferrule to deform. This deformation is generally evidenced by cupping of the front face of the ferrule. The presence of moisture and humidity may also cause the optical fibers to somewhat withdraw into the ferrule, while correspondingly causing the front face of the ferrule to swell. If this occurs, the protrusion distance can be significantly reduced. In addition, dust, dirt or other debris may accumulate on the front face of the ferrule. Moreover, the application of mechanical loads to the optical fibers may further cause the ferrule to deform. For example, a spring load of two pounds placed across twelve optical fibers may cause the front face of the ferrule to deform by about 4 $\mu$m relative to the end portions of the optical fibers. The protrusion distance may be lessened to the point of preventing fiber-to-fiber contact as a result of the combined effects of the cupping and swelling of the front face of the ferrule, the partial withdrawal of the optical fibers into the ferrule, the accumulation of dust, dirt or other debris upon the front face of the ferrule, and the loads placed upon the optical fibers. The end portions of the optical fibers may therefore be separated or spaced from one another, thereby undesirably increasing the attenuation and reflectivity experienced by the signals transmitted via the optical fibers.

These problems are exacerbated as the area of the potential contact region between the front faces of the mated ferrules, i.e., the area across which the front faces of the mated ferrules would make contact in the absence of fiber protrusion, increases. In this regard, the problems are exacerbated since more opportunities are provided for the disadvantageous accumulation of dust, dirt or other debris in the area of the potential contact region. The issues with respect to the accumulation of dust, dirt or other debris are particularly problematic in instances in which the potential contact region includes the guide pin holes since a greater percentage of dust, dirt and other debris accumulates about the guide pin holes than upon other portions of the front face of the ferrule. Additionally, if the potential contact region is a large area, the undesirable effects of ferrule deformation and swelling as a result of exposure to moisture and humidity are increased. Moreover, the force applied to the optical fibers that urges the optical fibers into contact may be diminished in instances in which the front faces of the mated ferrules make contact across a relatively large area.

In order to establish physical contact between corresponding optical fibers of a pair of mated multifiber connectors, the end portions of the optical fibers must not only protrude beyond the front face of the respective ferrule, but must also be relatively co-planar, i.e., the end portions of the optical fibers of each respective mating part must generally lie within the same plane. Conventional processes are generally unable to establish co-planarity any closer than about 250 nm, causing a variance in the protrusion distance. As will be apparent, as the variance in protrusion of the fibers increases, the difficulty in establishing direct physical contact between the end portions of each corresponding pair of optical fibers also increases.

Each optical fiber includes a core surrounded by a cladding. As a result of the germania dopant in the core, the core is oftentimes preferentially etched relative to the cladding, particularly in instances in which the end portions of the optical fibers are polished with relatively coarse abrasive particles. The preferential etching of the core with respect to the cladding causes core dip that further reduces the likelihood of the desired fiber-to-fiber contact and, in particular, the likelihood of physical contact between the cores of the corresponding pairs of optical fibers. The failure to establish physical contact between the cores of the corresponding pairs of optical fibers is particularly disadvantageous since the signals are transmitted through the cores of the optical fibers.

Multifiber connectors can suffer additional problems in instances in which the multifiber connectors are mounted upon multimode optical fibers. In this regard, the relatively coarse abrasive particles utilized in conventional processes for polishing the end portions of the optical fibers and the front face of the ferrule in order to attain the desired protrusion distance can cause or at least exacerbate core cracking of the multimode optical fibers. While some types of core cracking can be remedied by further processing, this additional processing only increases the time and cost required to fabricate the multifiber connector. Other types of core cracking cannot be corrected, however, and the multifiber connector must, instead, be scrapped.

Accordingly, it would be desirable to develop an improved ferrule assembly in which the protrusion distance increases the likelihood that direct physical contact will be established between the end portions of corresponding optical fibers of a pair of mated multifiber connectors. Likewise, it would be desirable to develop more efficient, precise and repeatable methods for fabricating ferrule assemblies having highly protruding optical fibers with consistent coplanarity. Moreover, with respect to connectors mounted upon a plurality of multimode fibers, it would be desirable to develop an improved process for fabricating the connectors to reduce the incidence of core cracking.

SUMMARY OF THE INVENTION

A ferrule assembly having highly protruding optical fibers and a corresponding method of efficiently, precisely and repeatedly fabricating ferrule assemblies having highly protruding optical fibers are provided according to the present invention. According to one aspect of the present invention, a ferrule assembly is provided that includes a plurality of optical fibers extending at least about 3.5 $\mu$m, taking account of customary manufacturing tolerances, beyond all portions of the front face. The end portions of the optical fibers of the ferrule assembly may also be substantially coplanar in that the end portions of the optical fibers differ in position from one another by no more than about 100 nm according to one embodiment. Thus, a pair of ferrule assemblies of the present invention may be mated such that direct physical contact is maintained between the end portions of the optical fibers even while the ferrule deforms and the optical fibers withdraw as a result of environmental conditions, loading or the like.

A ferrule assembly having highly protruding optical fibers may be fabricated in accordance with a method of one aspect of the present invention in which the optical fibers may remain extended beyond the front face of the ferrule during the entire fabrication process. According to this method, a ferrule assembly is initially provided with the end portions of the optical fibers extending beyond the front face of the ferrule. For example, the optical fibers may be severed, such as by a laser, at a location spaced apart from the front face of the ferrule. The end portions of the optical fibers are then lapped, generally with fine abrasive particles, to reduce the protrusion of the optical fibers beyond the front face of the ferrule. The lapping of the end portions of the optical fibers continues until the end portions of the optical fibers differ in position from one another by no more than a predefined amount, such as by no more than about 100 nm. Thus, the lapping of the end portions of the optical fibers may result in a substantially coplanar array of optical fibers.

The end portions of the optical fibers may also be polished with a flocked material. For example, the end portions of the optical fibers may be polished with a flocked material, typically a fine flocked material, after the end portions of the optical fibers have been lapped, such as to round the edges of the optical fibers. In addition, the end portions of the optical fibers may be polished with a coarse flocked material prior to lapping the end portions of the optical fibers to reduce the protrusion of the optical fibers and to remove at least some or all of the epoxy from the front face of the ferrule. Generally, the coarse flocked material has larger abrasive particles than the flocked material with which the end portions of the optical fibers are polished following lapping of the end portions of the optical fibers. According to this aspect of the present invention, the method efficiently fabricates a ferrule assembly having protruding optical fibers since the end portions of the optical fibers generally remain extended beyond the front face of the ferrule during the entire process, thereby obviating the need to grind or polish the end portions of the optical fibers flush with the front face of the ferrule prior to preferentially etching the front face of the ferrule relative to the end portions of the optical fibers as practiced by conventional techniques.

A ferrule assembly may therefore be fabricated that includes a ferrule having a front face and defining a plurality of bores opening through the front face. The ferrule assembly also includes a plurality of optical fibers extending through respective bores. According to one advantageous aspect of the present invention, the end portions of the optical fibers are at least partially rounded and extend at least about 3.5 $\mu$m beyond all portions of the front face of the ferrule. The end portions of the optical fibers may extend even further beyond the front face of the ferrule such as by protruding by at least 5 $\mu$m, at least 10 $\mu$m or at least 20 $\mu$m in some embodiments.

Regardless of the amount of protrusion, the end portions of the optical fibers of the ferrule assembly according to one aspect of the present invention are substantially co-planar in that the end portions differ in position from one another by no more than 100 nm. Additionally, the end portion of each optical fiber preferably differs in position from the end portions of the immediately adjacent optical fibers by no more than 50 nm. By utilizing fine abrasive particles, the core dip is also reduced, such as to less than 10 nm, as well as the possibility of core cracking for multimode optical fibers. By protruding at least about 3.5 $\mu$m beyond the front face of the respective ferrule and, in some embodiments, by exhibiting improved co-planarity and reduced core dip, a pair of ferrule assemblies may be mated so as to maintain the end portions of corresponding pairs of optical fibers in direct physical contact, even as the environmental conditions, loading and other factors vary.

According to one aspect of the present invention, the front face of the ferrule may at least initially include at least one polishing feature to further improve the efficiency of the fabrication process and quality and repeatability of the resulting ferrule assemblies. In addition to the polishing feature, the front face of the ferrule may also include a first portion through which the bores at least partially open. The polishing feature is offset with respect to a first portion. For example, the polishing feature may be a recessed portion having a reference surface, such as a planar or a curved reference surface, that extends in a rearward direction from the first portion of the front face. Alternatively, the polishing feature may be at least one pedestal having a planar surface that extends outwardly from the first portion of the front face of the ferrule, such as by a distance approximately equal to the desired protrusion of the optical fibers. In this embodiment, the ferrule can include first and second pedestals positioned on opposite sides of the first portion of the front face and extending outwardly therebeyond. For example, the plurality of bores may open through the front face along a reference line extending between opposite sides of the ferrule body. As such, the first and second pedestals of this embodiment may be positioned proximate the opposite sides of the ferrule body along the reference line.

In order to fabricate a ferrule assembly including a ferrule that initially has at least one polishing feature, the optical fibers are typically severed at a location spaced from the front face of the ferrule. The protrusion of the optical fibers beyond the front face of the ferrule is then reduced until the end portions of the optical fibers have a predefined relationship with respect to the at least one polishing feature. The polishing feature may then be at least partially removed such that the end portions of the optical fibers extend beyond all remaining portions of the front face of the ferrule.

In the embodiment that includes at least one pedestal extending outwardly from the first portion of the front face of the ferrule, for example, the protrusion of the optical fibers is reduced until the end portions of the optical fibers extend no further beyond the first portion of the front face than the pedestal(s). The optical fibers will therefore extend beyond the front face of the ferrule of the resulting ferrule assembly by a length approximately equal to the height of the pedestal(s).

In the embodiment that includes a recessed portion having a reference surface extending rearwardly from the first portion of the front face of the ferrule, the protrusion of the optical fibers is reduced until the end portions of the optical fibers lie along an imaginary surface defined by the reference surface of the recessed portion. In instances in which the recessed portion has a planar reference surface, the protrusion of the optical fibers is reduced at least until the end portions of the optical fibers are coplanar therewith. Alternatively, in instances in which the recessed portion has a curved reference surface, the protrusion of the optical fibers is reduced at least until the end portions of the optical fibers lie along a curved imaginary surface defined by the curved reference surface.

In the embodiment that includes a recessed portion, the reference surface may define a line of intersection with the adjacent portions of the front face of the ferrule. Although the reduction in the protrusion of the optical fibers may initially consist of polishing only the end portions of the optical fibers, continued polishing will generally begin to polish both the end portions of the optical fibers and the reference surface. As the reference surface is polished, the line of intersection typically moves toward the optical fibers. Thus, the spacing between the line of intersection and the optical fibers, such as a reference line extending through the plurality of optical fibers, provides a measure of the amount of protrusion of the optical fibers.

While reducing the protrusion of at least one optical fiber according to one embodiment, the spacing between the line of intersection and the at least one optical fiber may be monitored and the protrusion of the at least one optical fiber may continue to be reduced at least until the spacing between the line of intersection and the at least one optical fiber is no more than a predefined spacing. Since the spacing between the line of intersection and the optical fibers provides a measure of the amount of protrusion of the at least one optical fiber, the predefined spacing may be selected to correspond to a desired protrusion of the at least one optical fiber. By halting any further reduction in the protrusion of the at least one optical fiber once the predefined spacing is detected, the resulting ferrule will have an optical fiber with the desired protrusion. Moreover, by monitoring the spacing between the line of intersection and the at least one optical fiber, such as with a vision system, the method of this aspect of the present invention can reliably fabricate ferrules having optical fibers with a desired protrusion without requiring a relatively expensive interferometer to measure the protrusion of the optical fibers as is required by most conventional techniques. Additionally, the angle between the line of intersection and a reference line extending through the plurality of optical fibers may also be monitored since this angle corresponds to the angle at which the end portions of the optical fibers are being polished.

According to the present invention, ferrule assemblies are therefore provided having highly protruding optical fibers, such as optical fibers that protrude by about 3.5 μm to about 5 μm or more beyond the front face of the ferrule. In addition, ferrule assemblies having protruding optical fibers that are substantially co-planar, such as optical fibers having end portions that vary by no more than about 100 nm, are also provided. In mating a pair of multifiber connectors, direct physical contact between the end portions of corresponding pairs of optical fibers can be therefore be established and maintained. In addition, by polishing the end portions of the optical fibers to establish the desired protrusion without ever having to remove substantial portions of the front face of the ferrule one can increase the fabrication efficiency, particularly in instances in which the ferrule includes at least one polishing feature to define the desired protrusion distance.

BRIEF DESCRIPTION OF THE SEVERAL VIEWS OF THE DRAWING(S)

Having thus summarized the invention in general terms, reference will now be made to the accompanying drawings, which are not necessarily drawn to scale, and wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
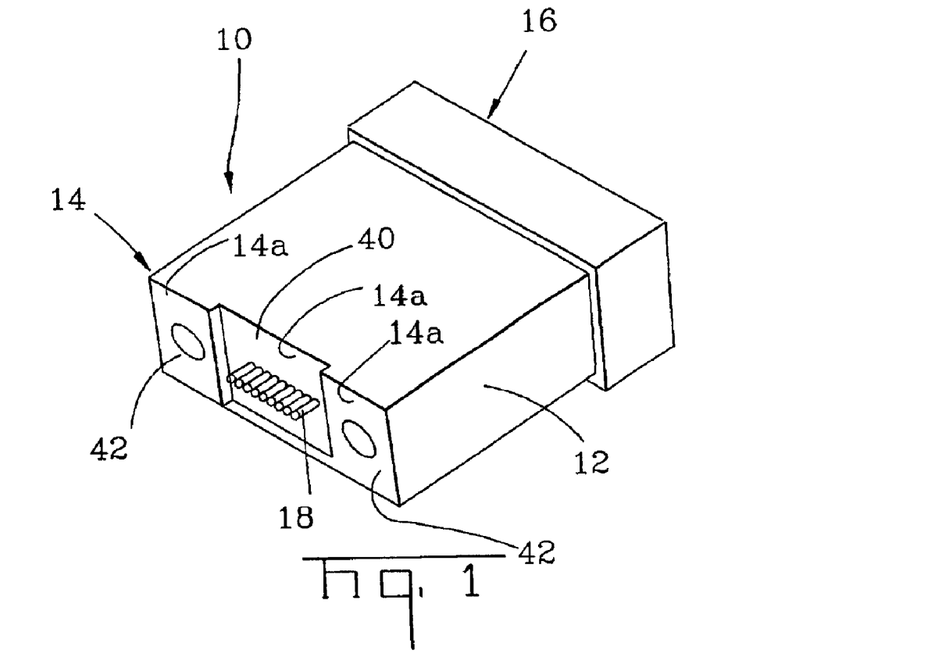
FIG. 1 is a perspective view of a ferrule including a pair of pedestals extending outwardly from the first portion of the front face of the ferrule according to one aspect of the present invention.

A ferrule assembly having highly protruding optical fibers and an associated method of fabricating ferrule assemblies are provided according to the present invention. As shown in FIG. 1, the ferrule assembly 10 includes a multifiber ferrule 12 extending between a front end 14 having a multi-section front face and an opposed rear end 16. The front face comprises surfaces 14a that are generally transverse with respect to the longitudinal axes of the optical fibers. While an MT ferrule is depicted in the figures, it should be understood that the ferrule may have any conventional form factor or may have a nonstandard form factor, if desired. Regardless of the form factor, the ferrule defines a plurality of bores extending between the rear and front ends and opening through the front face of the ferrule. Typically, the ferrule defines four, eight or twelve bores for receiving a corresponding number of optical fibers. However, the ferrule can define any number of bores depending upon the application. In addition, the ferrule can define the plurality of bores arranged in a two-dimensional array or other pattern, if so desired.

Figure 3A:
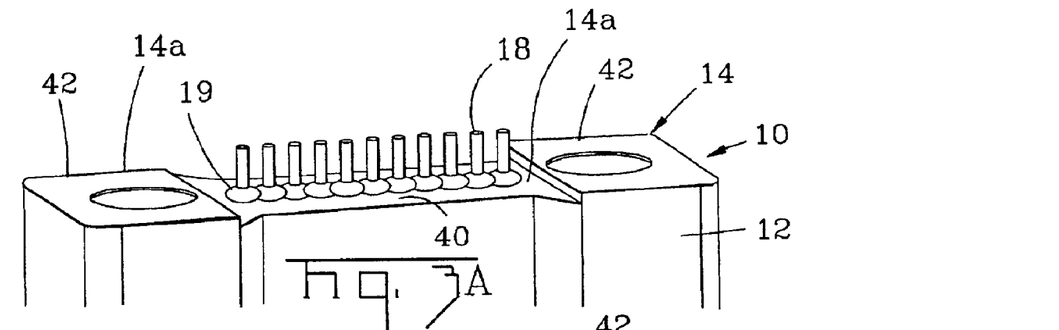
FIGS. 3A–3H are a series of sequential perspective views of the front face of a ferrule as the ferrule assembly is processed in accordance with the method set forth by the flow chart of FIG. 2.

The ferrule assembly 10 also includes a plurality of optical fibers 18 that extend through respective bores such that end portions of the optical fibers initially protrude beyond one or more of surfaces 14a, typically by 1 mm to 3 mm, as shown in FIG. 3A. The optical fibers may include either single mode fibers or multimode fibers depending upon the application of the ferrule assembly.

The optical fibers 18 are secured within the respective bores by epoxy. See block 20 of FIG. 2. Various epoxies may be utilized as known to those skilled in the art. With respect to multimode optical fibers, however, the epoxy is preferably heat-curable so as to provide the requisite radial compression. In order to minimize the possibility of core cracking, the epoxy is preferably selected to reduce the temperature required for curing.

Once the optical fibers 18 have been extended through and secured within the respective bores, the optical fibers are generally severed at a location spaced from the front face 14a. See block 22 of FIG. 2. While the optical fibers may be severed by scoring the optical fibers and then breaking the optical fibers along the scored line, the optical fibers are preferably cut with a laser beam. By utilizing a laser beam to cut the optical fibers, the possibility of core cracking for those ferrule assemblies 10 that include multimode optical fibers is further diminished. The optical fibers are generally severed at a much greater distance from the front face of the ferrule than the desired amount of protrusion. For example, the optical fibers may be severed at a distance of between 80 $\mu$m and 125 $\mu$m from the front face of the ferrule, as generally represented by FIG. 3B. Since the desired amount of protrusion of the optical fibers is typically between 3.5 $\mu$m and 50 $\mu$m, the end portions of the optical fibers must therefore be polished or otherwise processed in order to reduce the protrusion of the optical fibers.

The protrusion of the optical fibers 18 beyond the front face 14a may be reduced in various manners including by grinding or by various polishing operations. The protrusion is advantageously reduced in a manner that is not only reliable and accurate, but is also relatively simple, quick and inexpensive and, in one embodiment, has a minimum number of steps. As such, several different techniques for reducing the protrusion in a reliable and accurate manner are provided hereinbelow for illustrative purposes including a more involved technique that is described initially and that includes numerous steps to reduce the protrusion of the optical fibers and a more streamlined technique that is thereafter described to also reduce the protrusion of the optical fibers with only a couple of processing steps.

In one embodiment, at least the end portions of the optical fibers 18 are initially polished with a flocked material. As described by U.S. Pat. No. 6,106,368, the contents of which are incorporated herein by reference, a flocked material includes abrasive particles attached to a number of fibers that extend outwardly from a base, such as a polyethylene terephthalate base. Since the fibers of the flocked material are relatively flexible and compliant, the flocked material not only polishes the end portions of the optical fibers, but also removes most, if not all, of the epoxy beads 19 that have formed around the optical fibers proximate the front face 14a. In order to more effectively remove the epoxy from the front face of the ferrule, the end portions of the optical fibers may be polished with at least two different types of flocked material. For example, the end portions of the optical fibers may initially be polished with a first flocked material including coarse abrasive particles and may then be polished with a flocked material including fine abrasive particles. See blocks 24 and 26, respectively, of FIG. 2. See also FIG. 3C that depicts the front face of the ferrule following polishing with the first flocked material and FIG. 3D that depicts the front face of the ferrule following polishing with the second flocked material. While various types of flocked material can be utilized, a ferrule assembly of one embodiment is initially polished with a flocked material that includes aluminum oxide particles having an average size of 40 $\mu$m and is then polished with a flocked material having silicon carbide particles with an average size of about 16 $\mu$m. The end portions of the optical fibers can be polished with additional types of flock material if so desired, although polishing of the end portions of the optical fibers initially with coarse flock and then with fine flock has been found to be suitable while minimizing the number of different process steps.

While polishing with a flocked material reduces the protrusion distance of the optical fibers 18 beyond the front face 14a, polishing of the end portions of the optical fibers with the flocked material is generally a relatively slow process. Thus, once the epoxy has been removed from the front face of the ferrule, the protrusion of the optical fibers is typically further reduced by additional polishing steps that are more aggressive by reducing the protrusion of the optical fibers at a quicker rate. For example, in one embodiment in which the optical fibers are cut so as to protrude beyond the front face 14a of the ferrule by between about 80 $\mu$m and 125 $\mu$m (see FIG. 3B), the polishing of the end portions of the optical fibers with the flocked material reduces the protrusion of the optical fibers to between about 30 $\mu$m and 40 $\mu$m (see FIG. 3D). Thus, the end portions of the optical fibers may be further polished to reduce the protrusion of the optical fibers to the desired protrusion, such as 5 µm in one embodiment.

In order to continue reducing the protrusion of the optical fibers 18, the end portions of the optical fibers are advantageously polished with fine abrasive particles. As used herein, fine abrasive particles generally refers to abrasive particles having an average size of about 1 µm or less. This additional polishing of the end portions of the optical fibers with fine abrasive particles could be conducted in a single step as described below to produce a ferrule assembly 10 having optical fibers that protrude beyond the front face of the ferrule 12 by a predetermined amount, such as by lapping the end portions of the optical fibers with fine abrasive particles. In one embodiment, however, the end portions of the optical fibers are further polished with fine abrasive particles in at least two steps. In this regard, following the polishing of the end portions of the optical fibers with the flocked material, the end portions of the optical fibers may next be polished with a polishing film or other media having abrasive particles that have an average size of 1 µm or less. See block 28 of FIG. 2. This polishing continues until the end portions of the optical fibers protrude beyond the front face of the ferrule by a predetermined distance, such as 3.5 µm, 5 µm or more as shown in FIG. 3E and as described below. While the polishing film may carry various abrasive particles, the polishing film of one embodiment includes abrasive particles of silicone carbide.

Thereafter, variations in the position of the end portions of the optical fibers 18 are advantageously reduced such that the end portions of the optical fibers are more nearly coplanar. In this regard, the end portions of the optical fibers are generally polished with a hard lap such as by lapping the end portions of the optical fibers with fine abrasive particles. See block 30 of FIG. 2. The lap may utilize various abrasive particles carried by various backings. In general, however, better results, i.e., improved coplanarity, are obtained with harder laps. For example, the hard lap may be performed with abrasive particles of cerium, silicon carbide or alumina having an average size of 1 µm or less carried by a backing of Alumina Ceramic. Alternatively, variations in the relative positions of the end portions of the optical fibers may be reduced by polishing the end portions with a small grit film. In either instance, the resulting end portions of the optical fibers are substantially coplanar with the end portions of the optical fibers differing in position from one another by no more than 100 nm, as shown in FIG. 3F. Generally, the end portions of neighboring optical fibers vary in position by even a smaller amount. For example, the end portion of each optical fiber advantageously differs in position from the end portions of the immediately adjacent optical fibers, i.e., the neighboring optical fibers, by no more than 50 nm.

Typically, the end portions of the optical fibers 18 are then further polished with a flocked material to round the edges of the optical fibers while maintaining the end portions of the optical fibers with the desired protrusion and in a substantially coplanar relationship. See block 32 of FIG. 2 and FIG. 3G that depicts the front face of the ferrule 12 following this additional polishing step. While various types of flocked material can be utilized, one suitable flocked material has abrasive particles of cerium oxide with an average size of 0.05 µm. However, other flocked material having fine abrasive particles can similarly be utilized.

Figure 4:
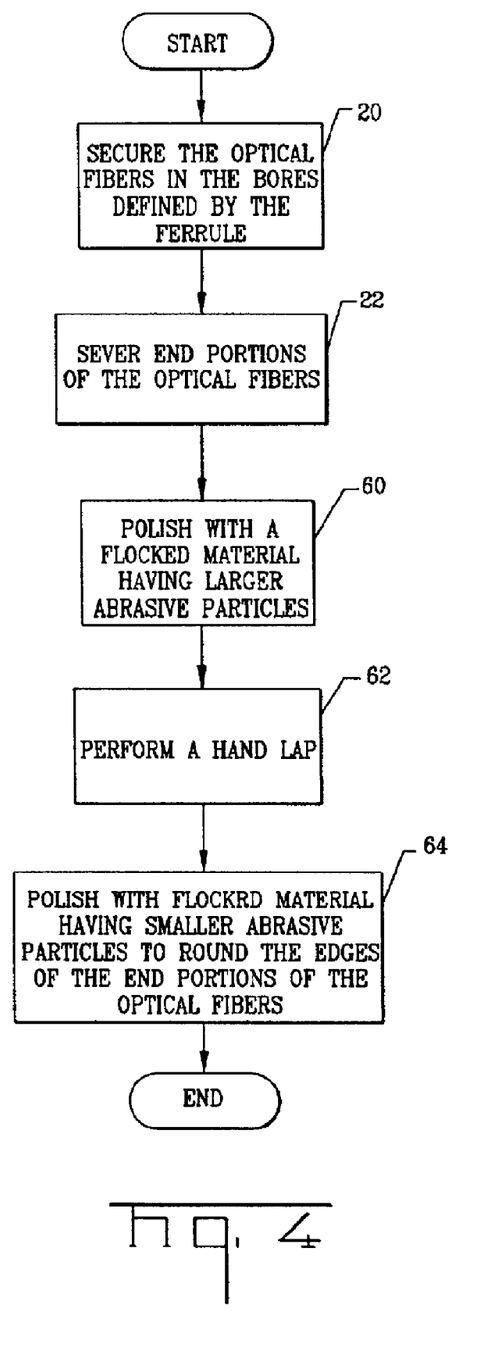
FIG. 4 is a flow chart illustrating the operations performed according to a method of another aspect of the present invention.

In another embodiment illustrated in FIG. 4, the number of steps utilized to reduce the protrusion of the optical fibers 18 is significantly reduced relative to the method described hereinabove. In this embodiment, after the optical fibers have been extended through the respective bores of the ferrule 12 and severed at a location spaced from the front face of the ferrule, the protrusion of the optical fibers is primarily, if not exclusively, reduced by means of a hard lap. In instances in which epoxy beads 19 have formed around the optical fibers proximate the front face of the ferrule, the end portions of the optical fibers may be polished with a flocked material as shown in block 60, before the hard lap. While various types of flocked material may be utilized, one exemplary flocked material is relatively coarse and includes silicone carbide particles having an average size of about 40 µm. After polishing the optical fibers with the coarse flock, the end portions of the optical fibers are hard lapped. As mentioned above, however, the optical fibers need not be initially polished with the flocked material and, instead, the hard lap of the end portions of the optical fibers could be performed as an initial step.

The hard lap serves to reduce the protrusion of the optical fibers 18 to the desired height and to reduce the height differential between the optical fibers, thereby improving the relative coplanarity of the optical fibers. In this regard, the end portions of the optical fibers are polished with a hard lap such as by lapping the end portions of the optical fibers with fine abrasive particles. See block 62 of FIG. 4. The lap may utilize various abrasive particles carried by various backings. In general, however, better results, i.e., improved coplanarity, are obtained with harder laps. For example, the hard lap may be performed with abrasive particles of cerium, silicon carbide or alumina having an average size of 1 µm or less. Once the hard lap is completed, the optical fibers preferably protrude beyond the front face of the ferrule by a predetermined distance, such as 3.5 µm, 5 µm or more. In addition, the resulting end portions of the optical fibers are substantially coplanar with the end portions of the optical fibers differing in position from one another by no more than 100 nm. Generally, the end portions of neighboring optical fibers vary in position by even a smaller amount. For example, the end portion of each optical fiber advantageously differs in position from the end portions of the immediately adjacent optical fibers, i.e., the neighboring optical fibers, by no more than 50 nm.

Following the hard lap, the edges of the end faces of the optical fibers 18 are generally quite sharp. As such, the end portions of the optical fibers may be polished with a flocked material to round the edges while maintaining the end portions of the optical fibers with the desired protrusion and in a substantially coplanar relationship. See block 64 of FIG. 4. Typically, the flocked material utilized to round the edges is finer than the flocked material that may be utilized initially to remove epoxy beads 19 or the like. For example, while various types of flocked material may be utilized, one suitable flocked material has abrasive particles of cerium with an average size of 1 µm.

The ferrule assembly 10 produced as a result of either of the methods set forth above therefore includes a ferrule 12 and a plurality of optical fibers 18 that extend through respective bores such that the end portions of the optical fibers extend a predetermined distance beyond all portions of the front face of the ferrule. In this regard, the end portions of the optical fibers may have a protrusion distance of at least about 3.5 µm beyond all portions of the front face 14a of the ferrule. In one advantageous embodiment, the end portions of the optical fibers preferably protrude by a predetermined distance that is at least slightly greater than the cumulative effect, upon the relative position of the end portions of the optical fibers with respect to the front face of the ferrule, of moisture, debris, loading and other conditions that alter the amount by which the end portions of the optical fibers protrude beyond all sections of the front face 14a of the ferrule. In this regard, a protrusion of at least 5 μm will generally permit the end portions of the optical fibers to continue to protrude beyond all portions of the front face of the ferrule as the ferrule is subjected to various environmental and loading conditions. As such, the ferrule assembly of one embodiment includes a plurality of optical fibers that extend at least 5 μm beyond the front face of the ferrule. In another embodiment, the optical fibers extend at least 10 μm and, in yet another embodiment, at least 20 μm beyond the front face of the ferrule. In still yet another embodiment, the end portions of the optical fibers extend at least 50 μm beyond front face 14a of the ferrule. While the fiber protrusion can be measured in various manners, Fiber Optic Test Procedure (FOTP) 219 authored by the Telecommunications Industry Association (TIA) identifies one suitable technique for measuring the fiber protrusion.

In addition to being highly protruding relative to the front face of the ferrule 12, the end portions of the optical fibers 18 are advantageously substantially coplanar. In this regard, the end portions of the optical fibers of the ferrule assembly 10 of one embodiment differ in position from one another by no more than about 100 nm, as measured in a lengthwise direction. The relative coplanarity may be determined in a conventional manner by fitting a line through the end portions of the optical fibers based upon a least squares fit approach as known to those skilled in the art, and then determining the maximum deviation of the end portion of any optical fiber from this least squares fit line. Not only are the optical fibers substantially coplanar on a global basis across the entire array of optical fibers, but the optical fibers are even more closely aligned on a local basis with respect to the neighboring optical fibers. In this regard, the end portions of the optical fibers preferably differ in position from end portions of the immediately adjacent optical fibers, i.e., the neighboring optical fibers, by no more than about 50 nm. As a result of the substantial coplanarity of the end portions of the optical fibers on both global and local bases, the ferrule assembly of the present invention is better capable of establishing physical contact between each of the optical fibers and corresponding optical fibers of another ferrule assembly. While the overall processing of the ferrule assembly assists in establishing the coplanarity of the end portions of the optical fibers, the hard lap of the end portions of the optical fibers significantly reduces variations in the positions of the end portions of the optical fibers.

As a result of the relatively small size of the abrasive particles utilized during most of the processing steps, the end portions of the optical fibers 18 do not have significant core dip, that is, the optical fibers generally have a core dip of less than 10 nm. While core dip may also be measured in various manners, one suitable technique is also described by FOTP 219. This relatively small core dip further enhances the direct physical contact established between the end portions of the optical fibers and corresponding optical fibers of another ferrule assembly. The polishing of the end portions of the optical fibers primarily, if not exclusively, with fine abrasive particles has still other advantageous effects. In this regard, polishing the end portions of the optical fibers with relatively small sized abrasive particles further reduces the possibility of core cracking in multimode optical fibers.

Figure 5:
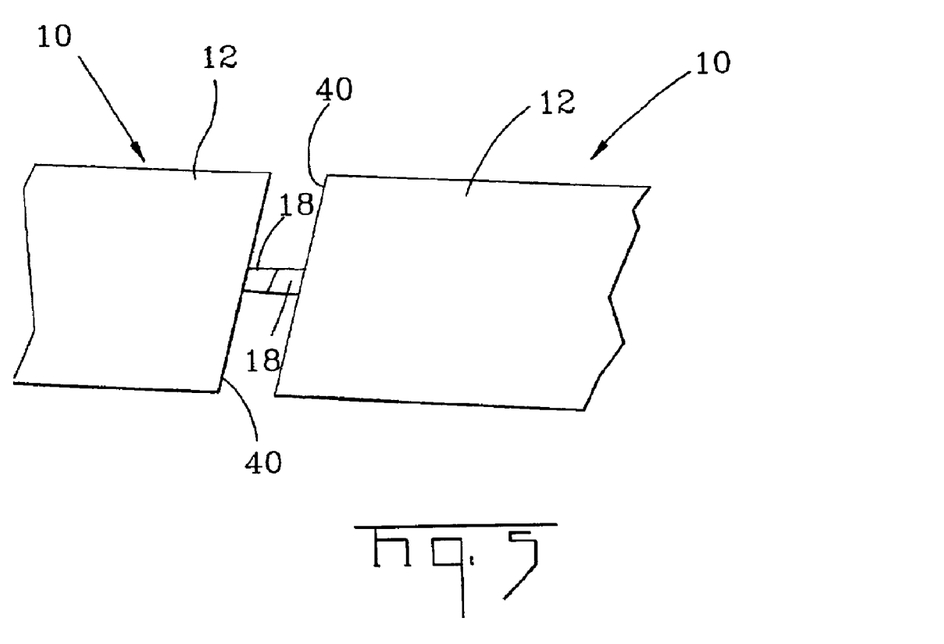
FIG. 5 is a side view of a pair of mated ferrule assemblies of the type depicted in FIG. 1.

By having optical fibers 18 that protrude 3.5 μm or more beyond the front face 14a of the respective ferrule 12 and, in some embodiments, that also exhibit improved co-planarity and reduced core dip, the ferrule assembly 10 of the present invention can be mated with another ferrule assembly so as to maintain the end portions of corresponding pairs of optical fibers in direct physical contact, even as the environmental conditions, loading and other factors vary. In this regard, the protrusion of the optical fibers is sufficient such that changes in the amount of protrusion of the optical fibers due to moisture, loading, debris or the like do not generally bring the front faces of the mated ferrules into contact and, as such, do not cause the end portions of the optical fibers to be separated. By way of example, the ferrule assembly of the present invention may be mated with another ferrule assembly to form a fiber optic interconnection in which the respective front faces of the ferrules are spaced apart from one another by at least the predetermined distance by which the optical fibers protrude beyond the front face of the ferrule, such as about 3.5 μm to about 5 μm or more. As such, the ferrule assembly of the present invention is readily compatible with conventional ferrule assemblies and permits physical contact to be advantageously established between corresponding pairs of the optical fibers. Moreover, if both ferrule assemblies of the fiber optic interconnection are fabricated according to the present invention so as to have highly protruding optical fibers, the front faces of the ferrules of the resulting fiber optic interconnection will be spaced apart from one another by the cumulative distance by which the optical fibers protrude beyond the front faces of their respective ferrules, such as 7 μm, 10 μm or more in the aggregate, as shown in FIG. 5.

In order to further improve the efficiency, the precision and the repeatability with which ferrule assemblies 10 of the present invention may be fabricated, the front face of the ferrule 12 may have a first portion 40 formed on a central section 14a of front end 14 through which the bores at least partially open and at least one polishing feature that is offset from the first portion, such as by extending forwardly or rearwardly relative to the first portion. Typically, the first portion of the front face is planar, although the first portion may have another shape if so desired. In instances in which the first portion is planar, the first portion may be oriented perpendicular to the optical fibers 18 or, as shown in FIG. 1, or as shown in FIG. 5, at a predefined angle, such as 8°, with respect to an imaginary plane constructed perpendicular to the optical fibers. Additionally, the bores typically open completely through the first portion of the front face of the ferrule. However, the bores could be generally aligned with the intersection of the first portion and a polishing feature so as to at least partially open through both the first portion and the polishing feature.

Figure 7A:
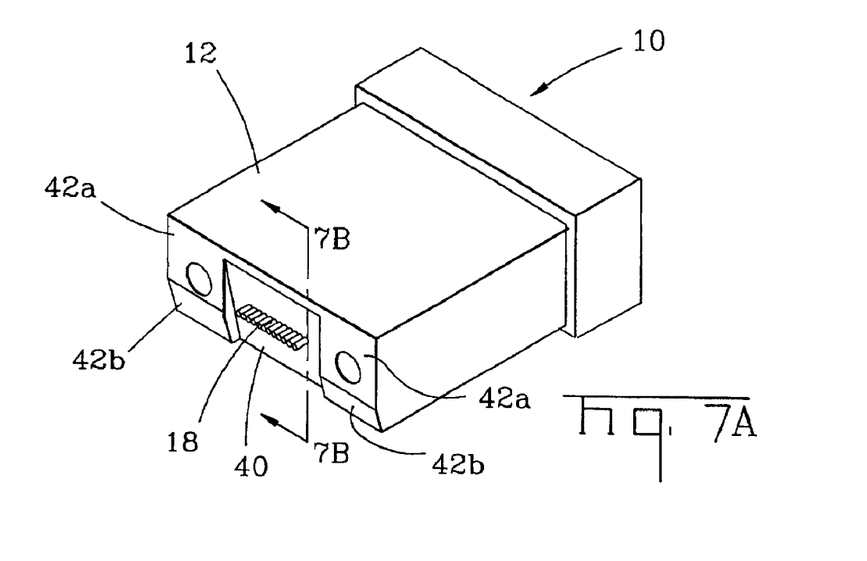
FIGS. 7A and 7B are perspective and cross sectional views of a ferrule assembly of another embodiment of the present invention that includes an outwardly extending pedestal having a complex reference surface.
Figure 7B:
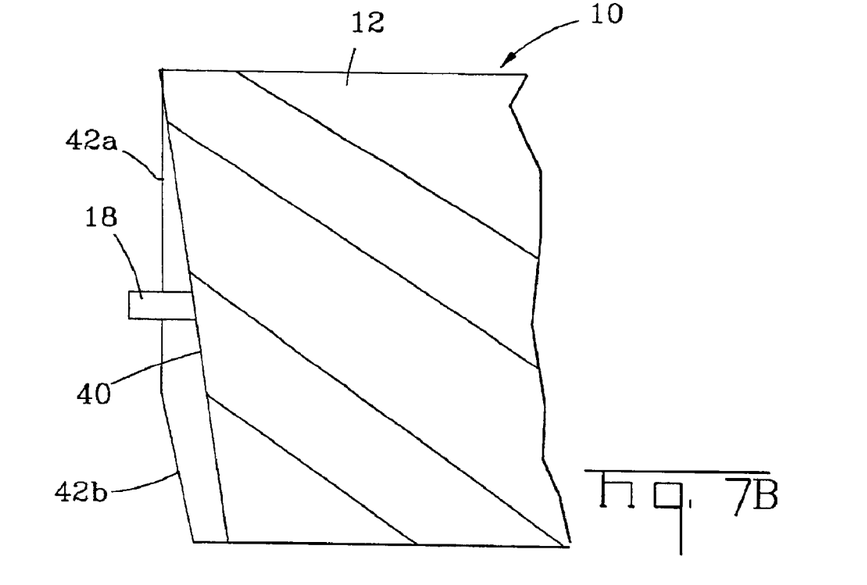

The ferrule 12 of this aspect of the present invention can include various types of polishing features. In one embodiment, for example, the polishing feature is at least one and, more typically, a plurality of pedestals 42 formed on the lateral sections of front face 14a extending outwardly beyond the first portion of the front face of the ferrule. As shown in FIGS. 1 and 3A–3H, each pedestal generally defines a surface that is spaced from the first portion 40 by at least the predetermined distance that the optical fibers 18 are desired to protrude beyond the front face of the ferrule. While each pedestal may have a planar surface as shown in FIGS. 1 and 3A–3H, each pedestal may have a surface with a more complex shape. As shown in FIGS. 7A and 7B, for example, each pedestal may include first and second planar surfaces 42a and 42b, with the first surface extending perpendicular to the optical fibers and the second surface extending parallel to the first portion of the front face of the ferrule. In order to impart the desired angle upon the end portions of the optical fibers, the second surface may serve as a polishing feature during polishing operations. While the polishing feature of this embodiment may be a single pedestal extending outwardly beyond the first portion 40 of the front face of the ferrule, such as along an entire edge of the front face or about the entire periphery of the front face, the ferrule may include a plurality of pedestals. For example, the ferrule may include first and second pedestals disposed in a symmetric relationship to the optical fibers, such as on opposite sides of the optical fibers. In one embodiment in which the optical fibers are arranged in a linear fashion, the first and second pedestals may be positioned either on opposite ends as shown in FIGS. 1, 3A–3H and 7A or on opposite sides of the linear arrangement of optical fibers.

Figure 6A:
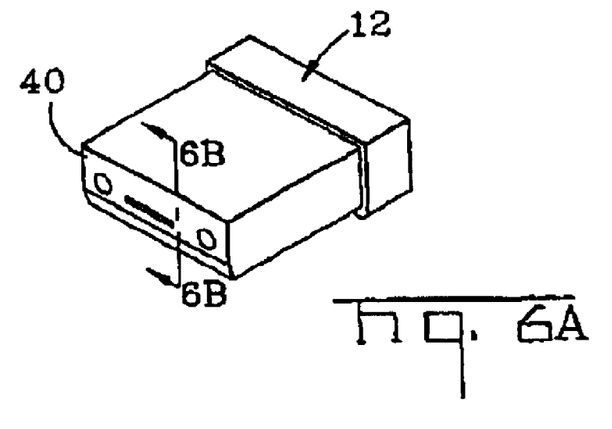
FIGS. 6A and 6B are perspective and cross sectional views of a ferrule assembly of another embodiment of the present invention that includes a planar recessed surface that serves as the polishing feature.
Figure 6B:
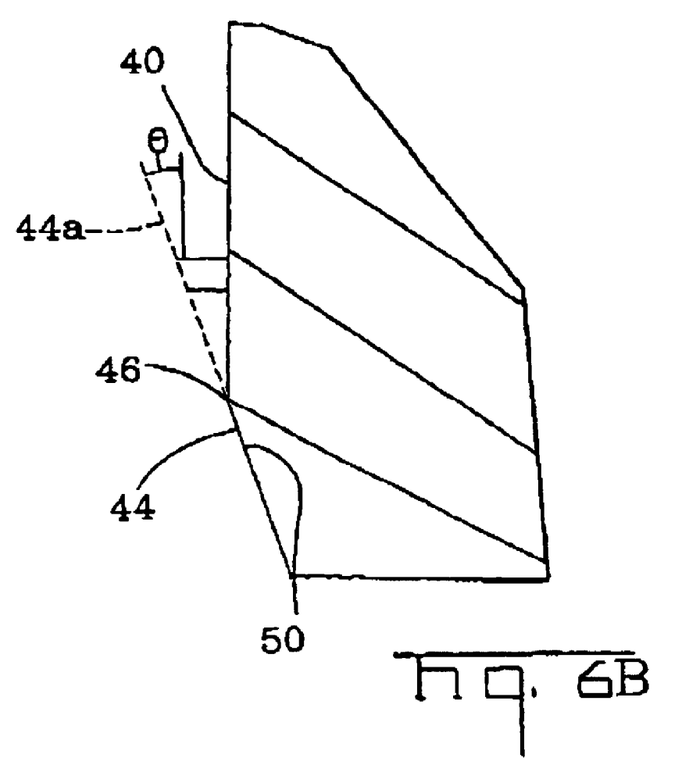
Figure 8A:
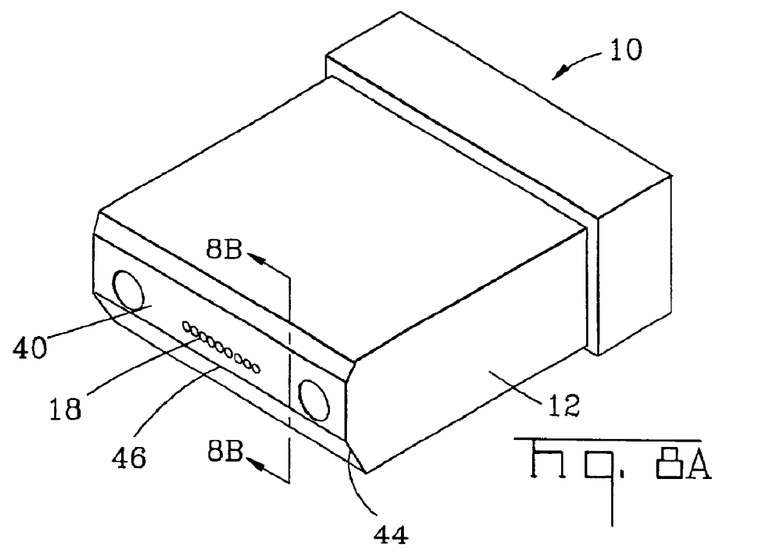
FIGS. 8A and 8B are perspective and cross sectional views of a ferrule assembly of another embodiment of the present invention that includes a curved recessed surface that serves as the polishing feature.
Figure 8B:
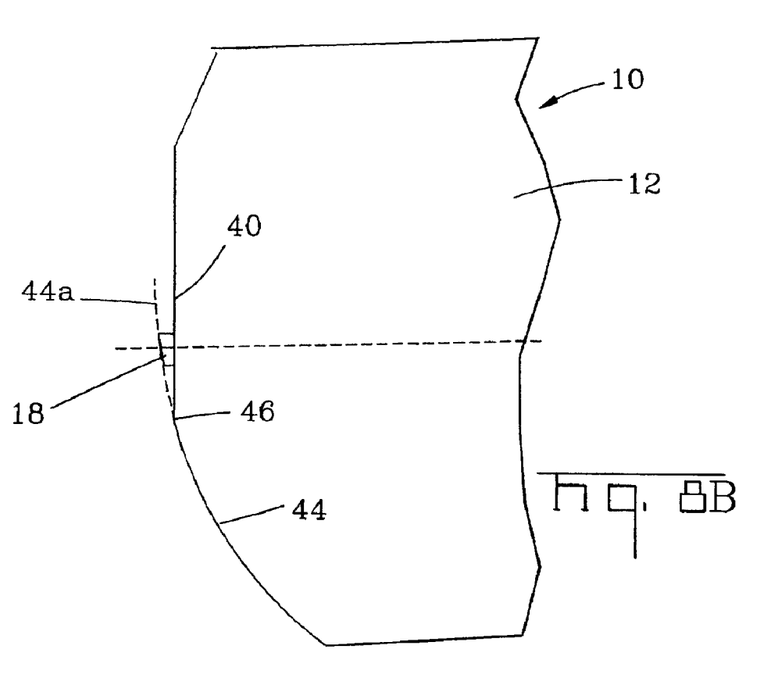

In another embodiment, the polishing feature is a recessed portion 44 of the front face of the ferrule 12. The recessed portion has a reference surface that extends rearwardly from the first portion 40 of the front face of the ferrule. As such, the first portion of the front face of the ferrule from which the optical fibers 18 extend is generally the forwardmost portion of the ferrule of this embodiment. The reference surface may be a planar surface as shown in FIGS. 6A and 6B or a curved surface as shown in FIGS. 8A and 8B. In either embodiment, the reference surface defines an imaginary surface 44a that, in turn, defines the location of the end portions of the optical fibers and, consequently, the protrusion of the optical fibers. In addition to defining the amount of fiber protrusion, the reference surface may also define the shape or profile of the end portions of the optical fibers. In this regard, the reference surface may be designed such that the resulting imaginary surface in which the end portions of the optical fibers will lie imposes a predefined profile or shape upon the end portions of the optical fibers, such as an angled end face having a predetermined slope. For example, in embodiments in which the recessed portion has a planar reference surface, the planar reference surface may be disposed at an angle θ of 8° with respect to the first portion of the front face of the ferrule such that the end portions of the optical fibers are also advantageously angled at 8° (FIG. 6B).

While the recessed portion 44 of this embodiment may define a continuous reference surface extending rearwardly from the first portion 40 of the front face of the ferrule 12, such as along an entire edge of the front face, the recessed portion may include one or more pedestals that cooperate to define the reference surface. In one embodiment, however, the recessed portion extends laterally across the entire front face of the ferrule or at least some region of the front face of the ferrule.

For a pair of mated ferrules in which the front face of at least one of the ferrules 12 has a recessed portion 44, the size or area of the potential contact region is advantageously reduced in comparison to conventional ferrules as a result of the rearward extension of the recessed portion. In instances in which the recessed portion extends along one side of the front face of each of a pair of mated ferrules, the size of the potential contact region and the amount of fiber protrusion distance are generally directly related. In this regard, as a line 46 along which the recessed portion intersects the first portion 40 of the front face is moved away from the optical fibers 18, both the size of the potential contact region and the protrusion distance of the optical fibers increase. Conversely, as the line along which the recessed portion intersects the first portion of the front face is moved toward the optical fibers, both the size of the potential contact region and the protrusion of the optical fibers decrease. Thus, the front face of the ferrule can be designed such that the resulting ferrule assembly 10 has a desired fiber protrusion and a potential contact region of an acceptable size.

As indicated by this correlation between the position of the line 46 relative to the optical fibers 18 and the protrusion of the optical fibers, the protrusion of the optical fibers can be indirectly measured by monitoring the spacing between the line and the optical fibers. In this regard, the protrusion of the optical fibers is generally equal to the spacing between the line and the optical fibers multiplied by the tangent of the angle between the recessed portion 44 and the first portion 40 of the front face 14a of the ferrule 12 through which the optical fibers extend. As described below, by monitoring the spacing between the line and the optical fibers and, more typically, between the line 46 and a reference line constructed through the optical fibers' center lines the protrusion of the optical fibers can also be monitored such that the polishing can be halted once the optical fibers have the desired protrusion. Typically, the spacing may be monitored by means of a vision system which is much less expensive that an interferometer which is typically required to directly measure optical fiber protrusion. Additionally, the angle between the line 46 and the reference line constructed through the optical fibers also corresponds to the angle at which the end faces of the optical fibers are being polished, thereby providing additional information during the polishing process.

Regardless of the configuration, the polishing feature is utilized during the reduction of the protrusion of the optical fibers 18. In this regard, after severing the optical fibers (see step 22), the end portions of the optical fibers may be polished, such as by means of a hard lap (see step 62). According to this embodiment, the lapping of the end portions of the optical fibers continues at least until the end portions of the optical fibers have a predefined relationship with respect to the polishing feature. In this regard, the end portions of the optical fibers are typically lapped until the end portions of the optical fibers lie in an imaginary surface 44a defined by and including the reference surface of the polishing feature. In embodiments in which the polishing feature is one or more upwardly extending pedestals 42, the end portions of the optical fibers may be lapped until the end portions of the optical fibers are coplanar with the reference surface of the pedestal(s) as shown in FIG. 3E. Alternatively, in embodiments in which the polishing feature is a recessed portion 44 of the front face of the ferrule 12, the end portions of the optical fibers may be lapped until the end portions of the optical fibers lie in the imaginary surface 44a defined by the reference surface of the recessed portion. As described above, the imaginary surface defined by and including the reference surface of the recessed portion is typically either a plane or a curved surface depending upon whether the reference surface of the recessed portion is planar or curved, respectively. Since the recessed portion extends rearwardly with respect to the first portion 40 of the front face of the ferrule, the optical fibers still protrude beyond the front face of the ferrule once the end portions of the optical fibers lie in the imaginary surface defined by the reference surface of the recessed portion.

The ferrule 12 of this aspect of the present invention may be designed such that the optical fibers 18 protrude beyond the front face of the ferrule by the desired length once the end portions of the optical fibers have the predefined relationship with respect to the polishing feature, such as by lying in the imaginary surface 44a defined by and including the reference surface of the polishing feature. Alternatively, the ferrule may be designed such that the optical fibers protrude beyond the front face of the ferrule by slightly more than the desired length once the end portions of the optical fibers have the predefined relationship with respect to the polishing feature, thereby necessitating additional polishing of the optical fibers, and generally the polishing feature as well, in order to obtain optical fibers having the desired protrusion. If polishing is to be continued after beginning to also polish the polishing feature, the extent of this additional polishing can be readily determined in embodiments in which the ferrule includes a recessed portion 44 that extends along one side of the front face since there is a direct relationship between fiber protrusion and the spacing between the optical fibers and the line 46 along which the recessed portion intersects the first portion of the front face, as described above. In this embodiment, the line along which the recessed portion intersects the first portion 40 of the front face may therefore be monitored, such as by a vision system, and the additional polishing may be discontinued once this line is in a predefined position, typically defined as a predefined spacing from the optical fibers.

Figure 9A:
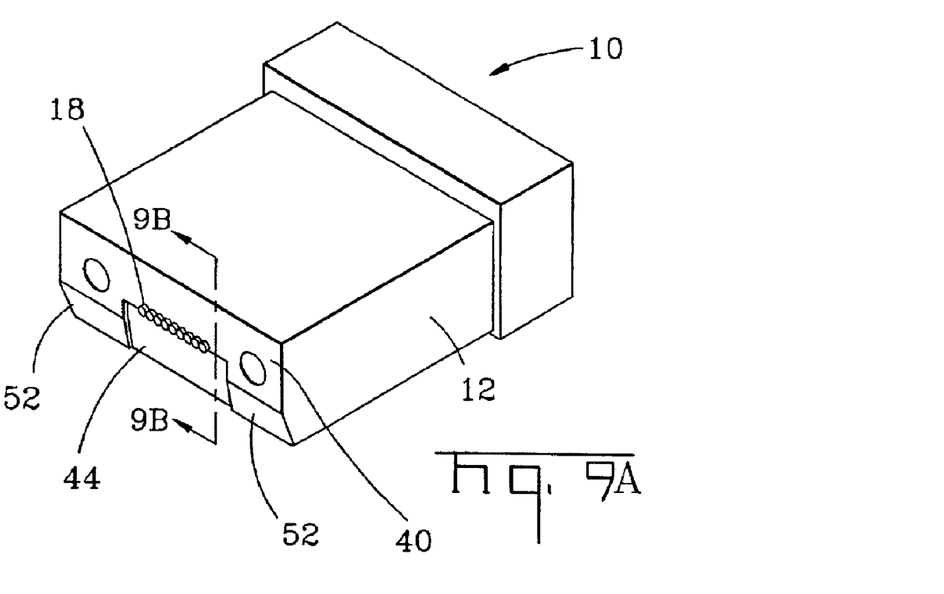
FIGS. 9A and 9B are perspective and cross sectional views of a ferrule assembly of another embodiment of the present invention.
Figure 9B:
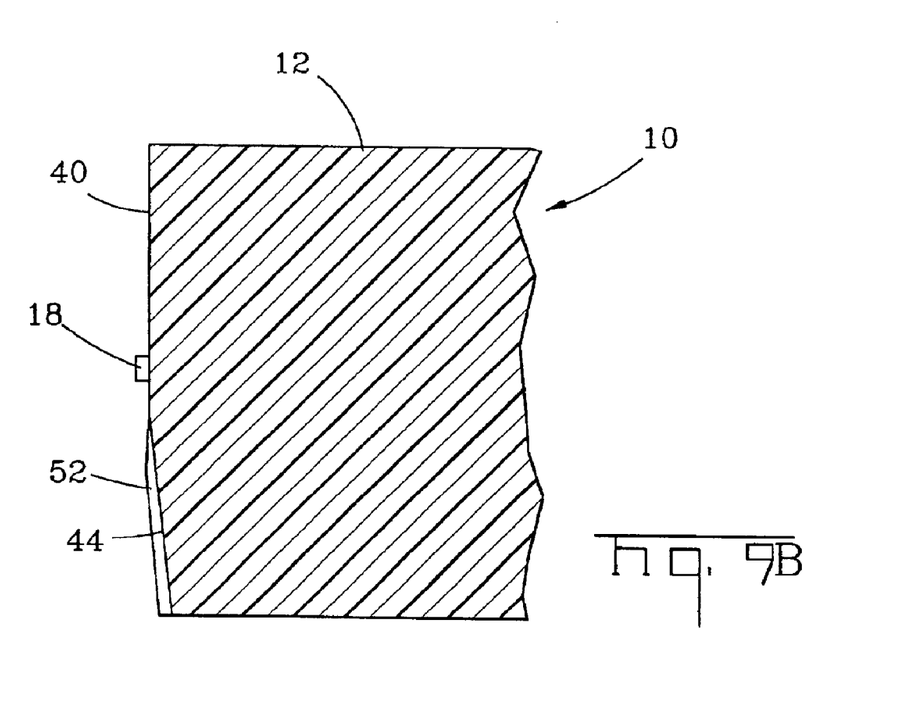

The polishing operations generally begin with polishing of the end portions of the optical fibers 18 without concurrently polishing or otherwise contacting the ferrule 12. However, the ferrule assembly 10 may be designed such that the optical fibers are polished concurrently with at least a portion of the front face of the ferrule in order to at least partially protect the optical fibers from the forces exerted during the polishing operations. In this regard, FIGS. 9A and 9B illustrate another embodiment of a ferrule assembly having a ferrule with a recessed portion 44 that is designed to at least partially protect the optical fibers during polishing operations. In this embodiment, the ferrule includes a bumper 52 that extends forwardly of the recessed portion. The bumper preferably extends a sufficient distance forward of the recessed portion such that the polishing media contacts the bumper prior to contacting the recessed portion, although typically after contacting the optical fibers. During the coarse of polishing the optical fibers, the bumper will also be polished and removed prior to beginning to polish or otherwise contacting the recessed portion.

The bumper 52 may have various shapes. While the bumpers of the embodiment depicted in FIGS. 9A and 9B taper at the same angle as the recessed portion 44, the bumpers may have other profiles. In addition, the bumpers may also be flush with the first portion 40 of the front face of the ferrule 12 or may protrude therebeyond, if desired. Additionally, while the ferrule of the embodiment depicted in FIGS. 9A and 9B has a pair of bumpers on opposite sides of a centrally located recessed portion, the ferrule may have other configurations of bumpers and recessed portions, such as a configuration having a pair of recessed portions on opposite sides of a single, centrally located bumper.

Figure 2:
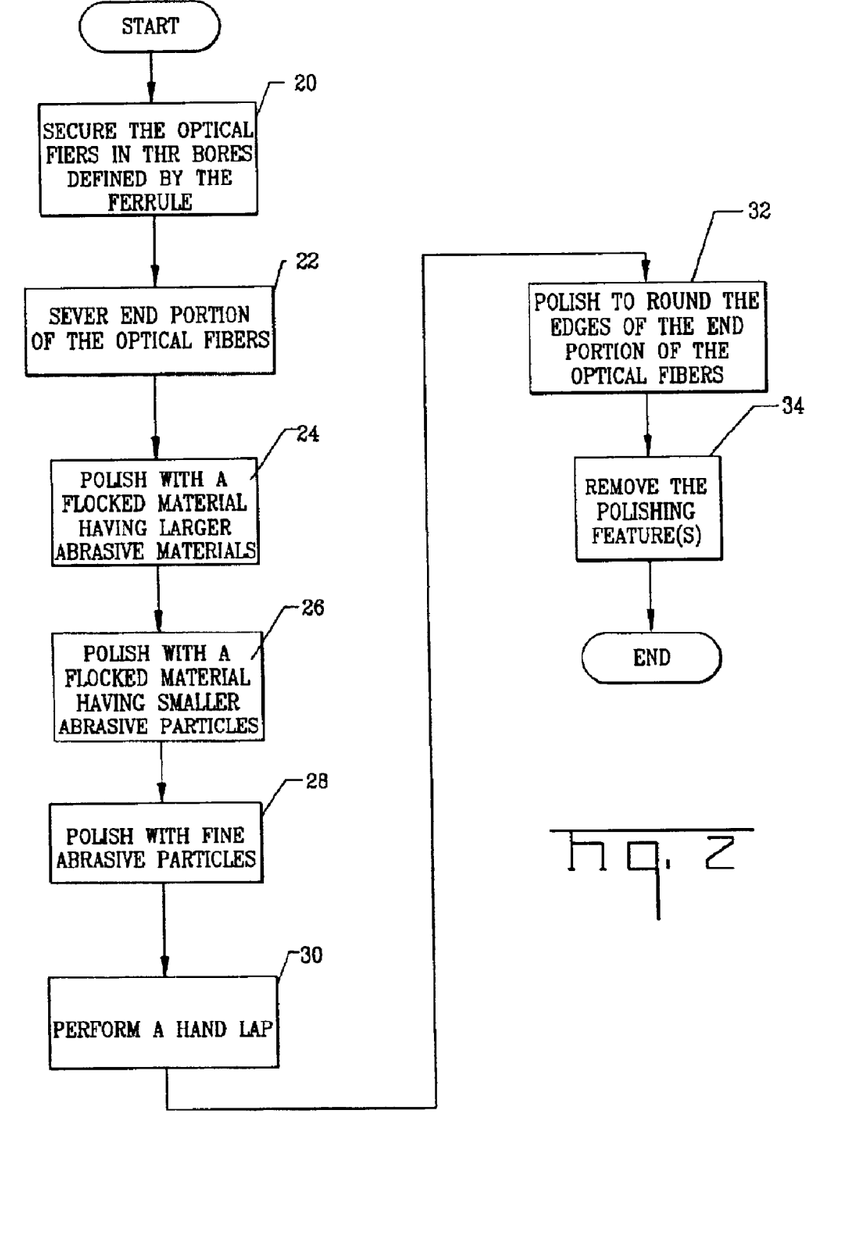
FIG. 2 is a flow chart illustrating the operations performed according to a method of one aspect of the present invention.
Figure 3B:
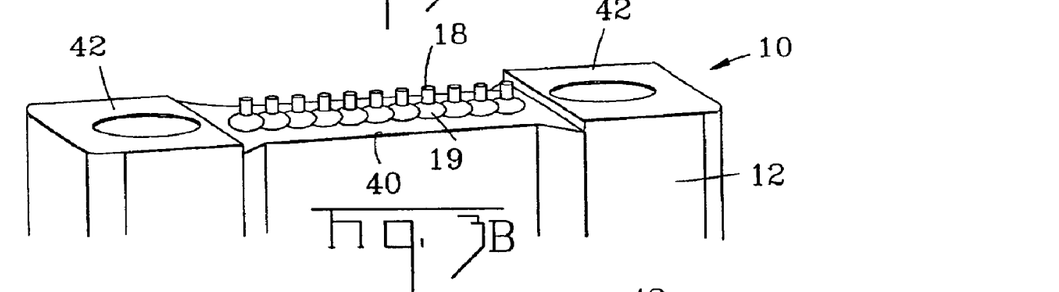
Figure 3C:
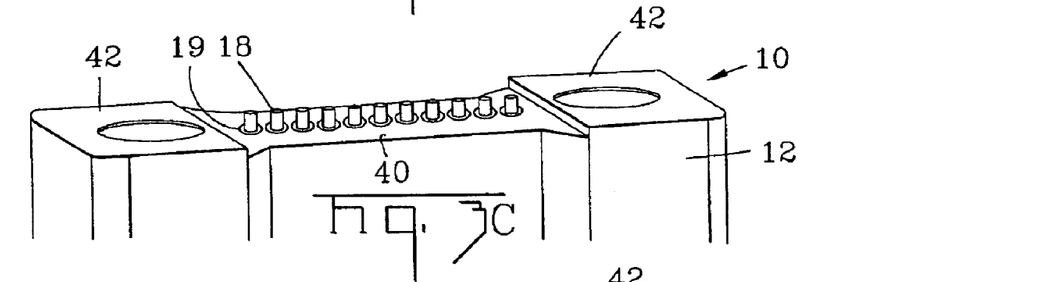
Figure 3D:
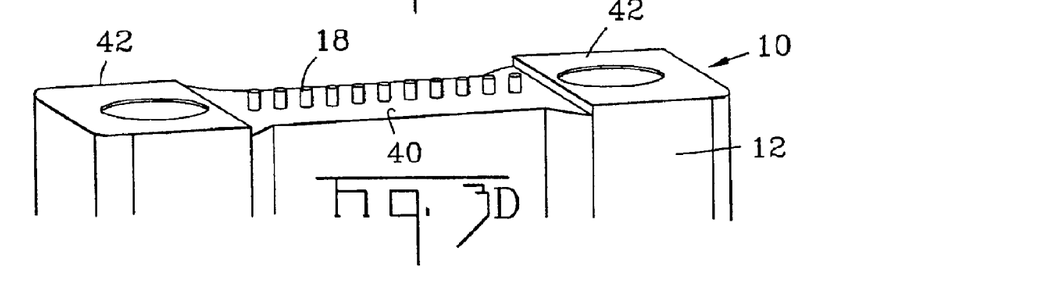
Figure 3E:
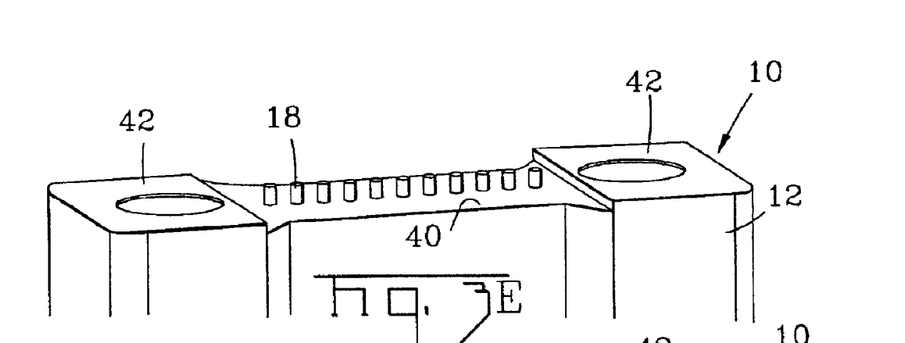
Figure 3F:
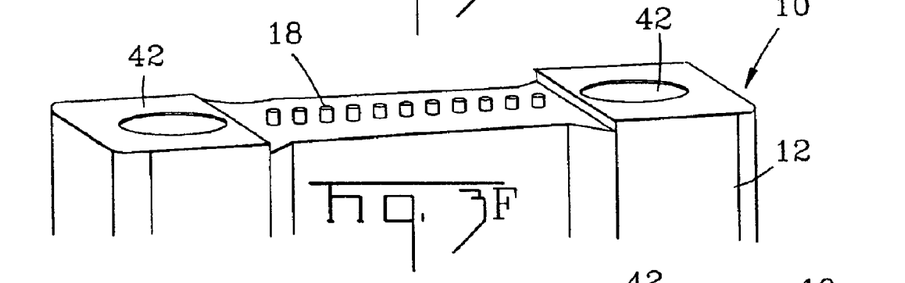
Figures 3G, 3H:
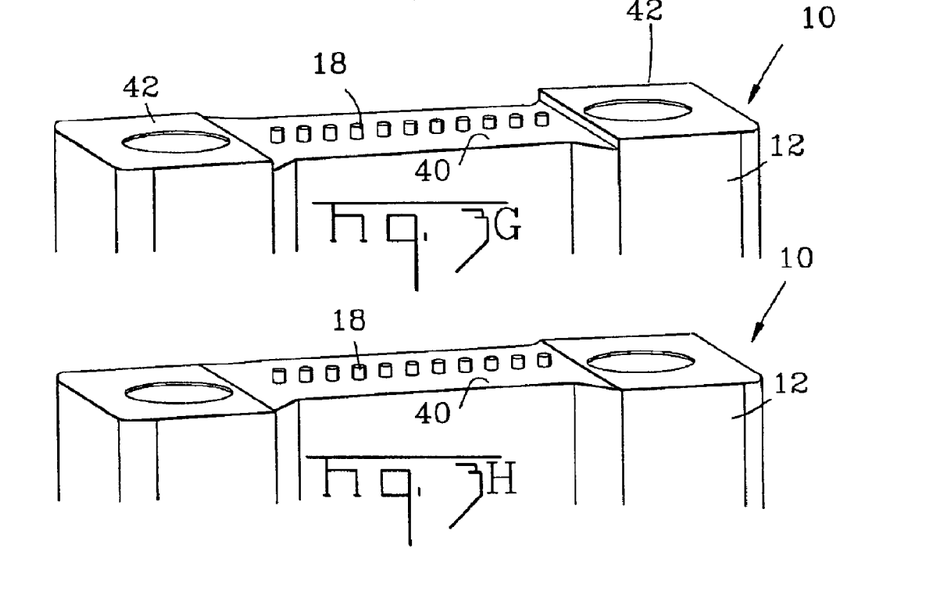

In at least some embodiments, the polishing feature(s) may then be removed, such as by grinding, as indicated by step 34 of FIG. 2. In the embodiment in which the ferrule 12 initially includes at least one outwardly extending pedestal 42, each pedestal may be removed. The resulting front face of the ferrule is typically either planar or chamfered following removal of the pedestal(s). See FIG. 3H which depicts the ferrule assembly 10 after the pedestals have been removed. In at least some of the embodiments in which the ferrule includes a recessed portion 44, the recessed portion may also be removed, such as by being further recessed. For example, the cross-hatched region 50 in FIG. 6B may be removed, if desired. By further recessing the recessed portion, the possibility that the front faces of a pair of mated ferrules will come into contact is further reduced. Moreover, even if the front faces of a pair of mated ferrules were to come into contact, the contact area would be advantageously reduced, if not eliminated, and could be sized and positioned so as not to include the guide pin holes, thereby avoiding the adverse effects of dust, dirt or other debris that commonly collects about the guide pin holes.

As will be apparent, the embodiment of the ferrule 12 that includes at least one polishing feature can improve the quality, efficiency and repeatability of the process by which the ferrule assemblies 10 of the present invention are fabricated. Regardless of whether the ferrules initially include polishing features, the fabrication efficiency is further improved according to the present invention by polishing the end portions of the optical fibers 18 to establish the desired protrusion without ever having to remove substantial portions of the front face of the ferrule. As a result of the advantageous fabrication processes, ferrule assemblies are therefore provided according to the present invention that have highly protruding optical fibers, such as optical fibers that protrude by about 3.5 $\mu$m to about 5 $\mu$m or more beyond the front face of the ferrule. In addition, ferrule assemblies having protruding optical fibers that are substantially co-planar, such as optical fibers having end portions that vary by no more than about 100 nm, are also provided. In mating a pair of multifiber connectors, direct physical contact between the end portions of corresponding pairs of optical fibers can be therefore be established and maintained, even in the presence of moisture, debris, loading and the like.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of fabricating a ferrule assembly comprised of a ferrule having a front face and defining a plurality of bores opening through a first portion of the front face, the front face of the ferrule including at least one polishing feature offset with respect to the first portion, the ferrule assembly further comprising a plurality of optical fibers extending through respective bores of the ferrule, the method comprising:

positioning end portions of the optical fibers beyond the front face of the ferrule;

reducing protrusion of the optical fibers beyond the front face of the ferrule until end portions of the optical fibers have a predefined relationship with respect to the at least one polishing feature; and     at least partially removing the at least one polishing feature after reducing the protrusion of the optical fibers such that the end portions of the optical fibers extend beyond all portions of the front face of the ferrule.

2. A method according to claim 1 wherein the at least one polishing feature of the ferrule comprises at least one pedestal extending outwardly beyond the first portion, and wherein reducing protrusion of the optical fibers comprises reducing protrusion of the optical fibers at least until end portions of the optical fibers extend no further beyond the first portion of the front face of the ferrule than the at least one pedestal.

3. A method according to claim 1 wherein the at least one polishing feature of the ferrule comprises a recessed portion having a reference surface that extends in a rearward direction from the first portion of the front face of the ferrule, and wherein reducing protrusion of the optical fibers comprises reducing protrusion of the optical fibers at least until end portions of the optical fibers lie along an imaginary surface defined by the reference surface of the recessed portion of the front face of the ferrule.

4. A method according to claim 3 wherein the recessed portion of the front face of the ferrule has a planar reference surface, and wherein reducing protrusion of the optical fibers further comprises reducing protrusion of the optical fibers at least until end portions of the optical fibers are coplanar with the planar reference surface of the recessed portion of the front face of the ferrule.

5. A method according to claim 3 wherein the recessed portion of the front face of the ferrule has a curved reference surface, and wherein reducing protrusion of the optical fibers further comprises reducing protrusion of the optical fibers at least until end portions of the optical fibers lie along a curved imaginary surface defined by the curved reference surface of the recessed portion of the front face of the ferrule.

6. A method according to claim 1 wherein reducing protrusion of the optical fibers comprises polishing the end portions of the optical fibers at least until the polishing medium also begins to polish the at least one polishing feature.

7. A method according to claim 1 wherein reducing protrusion of the optical fibers comprises lapping the end portions of the optical fibers with fine abrasive particles.

8. A method according to claim 7 wherein reducing protrusion of the optical fibers further comprises polishing the end portions of the optical fibers with a flocked material following lapping of the end portions of the optical fibers.

9. A method according to claim 8 wherein reducing protrusion of the optical fibers further comprises polishing the end portions of the optical fibers with a coarse flocked material prior to lapping the end portions of the optical fibers, wherein the coarse flocked material has larger abrasive particles than the flocked material with which the end portions of the optical fibers are polished following lapping of the end portions of the optical fibers.

10. A method according to claim 1 wherein providing the ferrule assembly with end portions of the optical fibers protruding beyond the front face of the ferrule comprises severing the optical fibers at a location spaced from the front face of the ferrule.

11. A method according to claim 10 wherein severing the optical fibers comprises cutting the optical fibers with a laser beam.

12. A method of fabricating a ferrule assembly comprised of a ferrule having a front face and defining a plurality of bores opening at least partially through a first portion of the front face, the front face of the ferrule also including a recessed portion having a reference surface that extends in a rearward direction from the first portion of the front face of the ferrule, the ferrule assembly further comprising a plurality of optical fibers extending through respective bores of the ferrule, the method comprising:

providing the ferrule assembly with end portions of the optical fibers extending beyond the front face of the ferrule; and reducing protrusion of the optical fibers beyond the front face of the ferrule at least until end portions of the optical fibers lie along an imaginary surface defined by the reference surface of the recessed portion of the front face of the ferrule, wherein the end portions of the optical fibers remain extended beyond the front face of the ferrule during the reduction in protrusion of the optical fibers.

13. A method according to claim 12 wherein the recessed portion of the front face of the ferrule has a planar reference surface, and wherein reducing protrusion of the optical fibers further comprises reducing protrusion of the optical fibers at least until end portions of the optical fibers are coplanar with the planar reference surface of the recessed portion of the front face of the ferrule.

14. A method according to claim 12 wherein the recessed portion of the front face of the ferrule has a curved reference surface, and wherein reducing protrusion of the optical fibers further comprises reducing protrusion of the optical fibers at least until end portions of the optical fibers lie along a curved imaginary surface defined by the curved reference surface of the recessed portion of the front face of the ferrule.

15. A method according to claim 12 wherein reducing protrusion distances of the optical fibers comprises polishing the end portions of the optical fibers with a polishing medium at least until the polishing medium also begins to polish the reference surface of the recessed portion of the front face of the ferrule.

16. A method according to claim 15 wherein the front face of the ferrule also includes at least one bumper extending in a forward direction with respect to the recessed portion, and wherein reducing protrusion of the optical fibers comprises polishing the at least one bumper while concurrently polishing the end portions of the optical fibers.

17. A method according to claim 12 wherein reducing protrusion of the optical fibers comprises lapping the end portions of the optical fibers with fine abrasive particles.

18. A method according to claim 17 wherein reducing protrusion of the optical fibers further comprises polishing the end portions of the optical fibers with a flocked material following lapping of the end portions of the optical fibers.

19. A method according to claim 18 wherein reducing protrusion of the optical fibers further comprises polishing the end portions of the optical fibers with a coarse flocked material prior to lapping the end portions of the optical fibers, wherein the coarse flocked material has larger abrasive particles than the flocked material with which the end portions of the optical fibers are polished following lapping of the end portions of the optical fibers.

20. A method according to claim 12 wherein providing the ferrule assembly with end portions of the optical fibers extending beyond the front face of the ferrule comprises severing the optical fibers at a location spaced from the front face of the ferrule.

21. A method according to claim 20 wherein severing the optical fibers comprises cutting the optical fibers with a laser beam.

22. A method of fabricating a ferrule assembly comprised of a ferrule having a front face and defining at least one bore opening at least partially through a first portion of the front face, the front face of the ferrule also including a recessed portion having a reference surface that extends in a rearward direction from a line of intersection with first portion of the front face of the ferrule, the ferrule assembly further comprising at least one optical fiber extending through a respective bore of the ferrule, the method comprising:

reducing protrusion of the at least one optical fiber beyond the front face of the ferrule;

monitoring spacing between the line of intersection and the at least one optical fiber while reducing protrusion of the at least one optical fiber; and continuing to reduce the protrusion of the at least one optical fiber by polishing both the at least one optical fiber and the reference surface at least until the spacing between the line of intersection and the at least one optical fiber is no more than a predefined spacing.

23. A method according to claim 22 wherein the ferrule defines a plurality of bores and the ferrule assembly comprises a plurality of optical fibers extending through respective bores of the ferrule, and wherein said monitoring comprises monitoring the spacing between the line of intersection and a reference line extending through the plurality of optical fibers.

24. A method according to claim 23 wherein said monitoring comprises also monitoring an angle between the line of intersection and the reference line.

25. A method according to claim 22 wherein polishing both the at least one optical fiber and the reference surface comprises polishing both the at least one optical fiber and the reference surface at an angle defined by the reference surface relative to the first portion of the front face of the ferrule.

26. A method according to claim 22 wherein reducing the protrusion of the at least one optical fiber further comprises initially polishing only the at least one optical fiber prior to polishing both the at least one optical fiber and the reference surface.

27. A ferrule assembly comprising:
a ferrule having a front face and defining a plurality of bores opening through the front face; and
a plurality of optical fibers extending through respective bores such that end portions of said optical fibers extend at least about 3.5 µm beyond all portions of the front face of said ferrule, wherein the end portions of said optical fibers have at least partially rounded edges and differ in position from one another by no more than about 100 nm and wherein the end portion of each optical fiber differs in position from end portions of the immediately adjacent optical fibers by no more than about 50 nm.

28. A ferrule assembly comprising:
a ferrule having a front face and defining a plurality of bores opening through the front face; and
a plurality of optical fibers extending through respective bores such that end portions of said optical fibers extend at least about 3.5 µm beyond all portions of the front face of said ferrule, wherein the end portions of said optical fibers have at least partially rounded edges and differ in position from one another by no more than about 100 nm, wherein each optical fiber comprises a core surrounded by a cladding, and wherein the end portion of each optical fiber has a core dip in which the cladding protrudes beyond the core by no more than 10 nm.

29. A ferrule assembly according to claim 27 wherein the end portions of said optical fibers extend at least 5 µm beyond the front face of said ferrule.

30. A ferrule assembly according to claim 27 wherein the end portions of said optical fibers extend at least 10 µm beyond the front face of said ferrule.

31. A ferrule assembly according to claim 27 wherein the end portions of said optical fibers extend at least 20 µm beyond the front face of said ferrule.

32. A ferrule assembly comprising:
a ferrule having a front face and defining a plurality of bores opening through the front face, wherein the front face of said ferrule includes a first portion through which the plurality of bores at least partially open and a recessed portion having a reference surface that extends in a rearward direction from the first portion of the front face; and
a plurality of optical fibers extending through respective bores of said ferrule, wherein end portions of said optical fibers lie along an imaginary surface defined by the reference surface of the recessed portion of the front face of said ferrule.

33. A ferrule assembly according to claim 32 wherein the recessed portion comprises at least one pedestal having the reference surface that defines the imaginary surface along which the end portions of said optical fibers lie.

34. A ferrule assembly according to claim 32 wherein the reference surface of the recessed portion of the front face of said ferrule is planar and lies in a coplanar relationship with the end portions of said optical fibers.

35. A ferrule assembly according to claim 32 wherein the reference surface of the recessed portion of the front face of said ferrule is curved, and wherein the end portions of said optical fibers lie along a curved imaginary surface defined by the curved reference surface of the recessed portion of the front face of said ferrule.

36. A ferrule assembly according to claim 32 wherein the front face of said ferrule also has at least one bumper extending in a forward direction with respect to the recessed portion.

37. A ferrule comprising:
a ferrule body having a front face and defining a plurality of bores opening through the front face, wherein the front face of said ferrule body includes a first portion through which the plurality of bores at least partially open and first and second pedestals positioned on opposite sides of the first portion and extending outwardly beyond the first portion, wherein the plurality of bores opening through the front face define a reference line extending between opposite sides of said ferrule body and said first and second pedastals are positioned proximate the opposite sides of said ferrule body along the reference line, and wherein said first and second pedestals have respective planar surfaces that lie in a coplanar relationship.

38. A ferrule according to claim 37 wherein said first and second pedestals extend at least 3.5 µm beyond the first portion of the front face.

39. A ferrule according to claim 37 wherein said first and second pedestals extend at least 5 µm beyond the first portion of the front face.

40. A ferrule according to claim 37 wherein said first and second pedestals extend at least 10 µm beyond the first portion of the front face.

41. A ferrule according to claim 37 wherein said first and second pedestals extend at least 20 µm beyond the first portion of the front face.

* * * * *